(12) United States Patent
van Ooij et al.

(10) Patent No.: US 8,012,374 B2
(45) Date of Patent: Sep. 6, 2011

(54) SLOW-RELEASE INHIBITOR FOR CORROSION CONTROL OF METALS

(75) Inventors: William J. van Ooij, Fairfield, OH (US); Hrishikesh Manian, Cincinnati, OH (US); Lin Yang, Cincinnati, OH (US); Hai Yang, Shanghai (CN)

(73) Assignee: The University Of Cincinnati, Cincinnati, OH (US)

( * ) Notice: Subject to any disclaimer, the term of this patent is extended or adjusted under 35 U.S.C. 154(b) by 738 days.

(21) Appl. No.: 10/981,017

(22) Filed: Nov. 4, 2004

(65) Prior Publication Data

US 2006/0091354 A1    May 4, 2006

(51) Int. Cl.
*C23F 11/00* (2006.01)
*C23F 11/18* (2006.01)
*B32B 5/00* (2006.01)

(52) U.S. Cl. ............. 252/389.54; 252/387; 428/402.24; 428/403; 428/407

(58) Field of Classification Search ............... 106/14.05; 252/387, 388, 389.54
See application file for complete search history.

(56) References Cited

U.S. PATENT DOCUMENTS

| | | | | |
|---|---|---|---|---|
| 3,977,992 A * | 8/1976 | Hofacker | ................. | 428/402.22 |
| 4,701,204 A * | 10/1987 | Duvdevani et al. | ................ | 71/28 |
| 4,763,729 A * | 8/1988 | Ramanarayanan | ........ | 166/244.1 |
| 4,948,485 A | 8/1990 | Wallsten et al. | | |
| 5,192,615 A * | 3/1993 | McDougall et al. | ..... | 428/402.24 |
| 5,620,743 A | 4/1997 | Harth et al. | | |
| 5,741,433 A * | 4/1998 | Mitchell et al. | ................. | 252/74 |
| 6,077,885 A * | 6/2000 | Hager et al. | ................... | 523/445 |
| 6,156,114 A | 12/2000 | Bell et al. | | |
| 6,383,301 B1 | 5/2002 | Bell et al. | | |
| 6,475,521 B1 * | 11/2002 | Timmins et al. | .............. | 424/469 |

FOREIGN PATENT DOCUMENTS

WO             96/11247 A1    4/1996
WO    WO 2004/009717         1/2004

OTHER PUBLICATIONS

"CRC Handbook of Chemistry and Physics" vol. 82, 2001, 6-156 and 6-165.*
International Search Report and Written Opinion received in connection with PCT/US2005/039333, dated Jan. 4, 2007, 9 pages.
Hrishikesh Manian, W.J. van Ooij, Y. Huant, *Magnetic Properties and Corrosions Resistance of Plasma Polymer Stabilized Cobalt Nanoparticles*, Presented at International Symposium on Plasma Chemistry-16, Taormin, Italy Jun. 22-27, 2003.
Hrishikesh Manian, W.J. van Ooij, V.V. Guliants, *Nanostructured Plasma Polymer Coatings on Novel Silica Structures*, Presented at IEEE NANO '03, San Francisco, CA, Aug. 11-14, 2003.
Hai Yang and Wim J. van Ooijj, *Plasma Deposition of Polymeric Thin Films on Organic Corrosion-Inhibiting Paint Pigments: A Novel Method to Achieve Slow Release*, Plasmas and Polymers, Sep. 18, 2003, 22:41.
Hai Yang and Wim J. van Ooij, *Plasma-treated triazole as a novel organic slow-release paint pigment for corrosion control of AA2024-T3*. Progress In Organic Coatings 50 (2004) 149-161.
Donglu Shi et al., *Uniform deposition of ultrathin polymer films on the surfaces of al2O3 nanoparticles by a plasma treatment*, Applied Physics Letters, vol. 78, No. 9, Sep. 26, 2001.
Donglu Shi et al., *Multi-Layer Coating of Ultrathin Polymer Films on Nanoparticles of Alumina by a Plasma Treatment*, Mat. Res. Soc. Symp., vol. 635, 2001.
Masayuki Kuzuya et al., *Plasma Techniques for Preparation of Controlled Drug Release System*, Plasmas and Polymers, vol. 6, No. 3, Sep. 2001.
M.N. Vasiliev et al., *Synthesis and deposition of coatings in the electron beam plasma*, Surface & Coatings Technology, 180-181 (2004) 132-135.
A. Quede et al., *Thermal stability and flammability studies of coated polymer powders using a plasma fluidized bed process*, Journal of Materials Science 37 (2002) 1395-1399.
D. Vollath, *Coated nanoparticles: A new way to improved nanocomposites*, Journal of Nanoparticle Research 1: 235-242, 1999.
F. Bretagnol et al. *Surface modification of polyethylene powder by nitrogen and ammonia low pressure plasma in a fluidized bed reactor*, Reactive and Functional Polymers 61 (2004) 221-232.
Peng He et al., *Deposition of Polymer Thin Films on ZnO Nanoparticles by a Plasma Treatment*, Mat. Res. Soc. Symp. Proc., vol. 703, 2002.
Donglu Shi et al., *Plasma Deposition and Characterization of Acrylic Acid Thin Film on ZnO Nanoparticles*, J. Mater. Res., vol. 17, No. 10, Oct 2002.
Peng He et al., *Plasma Coating and Enhanced Dispersion of Carbon Nanotubes*, Proc. Materials Research Society 791, (2004) Q10.7.1-6.
H. Yang et al., Plasma Deposition of Polymeric Thin Films on Organic Corrosion-Inhibiting Paint Pigments: A Novel Method to Achieve Slow Release, Plasma and Polymers, vol. 8, No. 4, No. 4, pp. 297-323, Dec. 2003.

* cited by examiner

*Primary Examiner* — Mark Eashoo
*Assistant Examiner* — Peter F Godenschwager
(74) *Attorney, Agent, or Firm* — Wood, Herron & Evans, LLP

(57) ABSTRACT

The present invention provides for a slow-release inhibitor that is applied to a metal surface, such as by way of a paint or primer coating, for corrosion control of the metal. An exemplary embodiment of the slow-release corrosion inhibitor includes a water-soluble particle, or pigment, and an organic polymeric film that encapsulates the particle. This water-soluble particle may be either organic or inorganic and, preferably, is non-carcinogenic and non-toxic. An additional water-soluble particle having an encapsulating, organic polymeric film further may be provided along with a water-soluble, organic compound to form the corrosion inhibitor. The polymeric film(s) are of a desired hydrophobicity and permeability to permit, upon interaction of the particle(s) with water, controlled diffusion of particle ions therethrough.

20 Claims, 1 Drawing Sheet

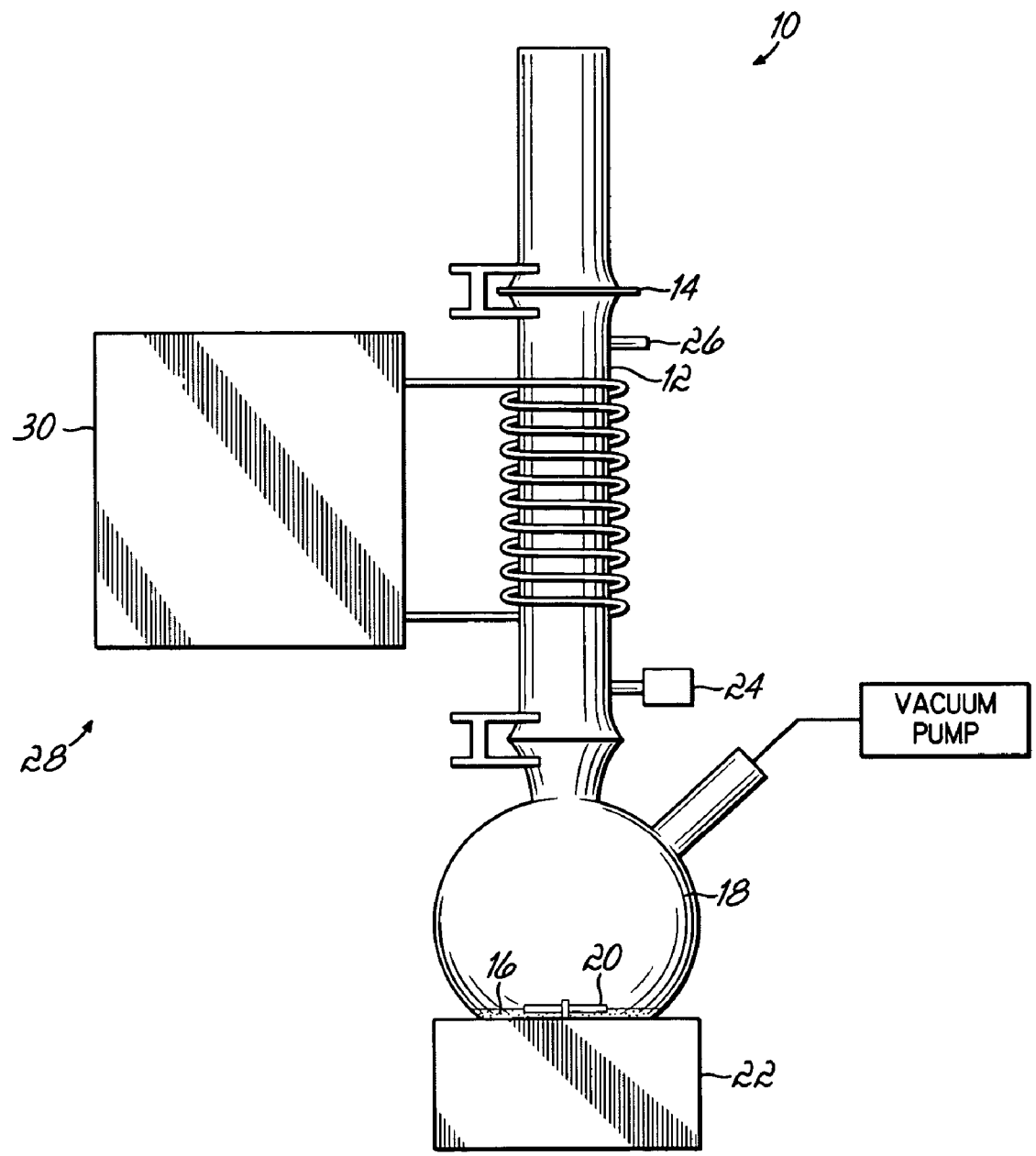

SLOW-RELEASE INHIBITOR FOR CORROSION CONTROL OF METALS

GOVERNMENT LICENSE RIGHTS

The U.S. Government has a paid-up license in this invention and the right in limited circumstances to require the patent owner to license others on reasonable terms as provided for by the terms of Grant/Contract No. AFOSR F 49620-01-1-0352 awarded by The U.S. Department of Defense as a part of the Multidisciplinary University Research Initiative (MURI) program.

FIELD THE INVENTION

The present invention pertains generally to corrosion inhibitors and, more particularly, to a slow-release, corrosion inhibitor useful for coating metal surfaces, such as by way of a paint or primer coating, to control corrosion thereof.

BACKGROUND OF THE INVENTION

Chromate inhibitors have long been the choice for corrosion protection of metals, such as steel, aluminum, iron, copper, alloys thereof, and the like. The commonly used chromate corrosion inhibitors, such as strontium chromate and barium chromate, are very slightly soluble and, as a result, are highly useful as pigments in paints or primer coatings, which are applied to metal surfaces. Although these pigments can be very effective in controlling the corrosion of metals, the resulting chromate ions are carcinogenic and toxic and, therefore, environmentally unfriendly and harmful to one's health.

Due to these hazards, the Environmental Protection Agency has mandated the elimination of chromate pigments. As such, there is an urgent need for the paint and pigment industries to seek an equally effective and environmentally benign corrosion inhibitor. However, a chromate-substituted inhibitor, such as for use in paints or primer coatings, has been a great challenge because of the high, i.e. quick, solubility of effective chromate replacements.

Accordingly, there is thus a need for a slow-release corrosion-inhibitor useful for coating metal surfaces, such as by way of a paint or primer coating, to effectively control corrosion thereof and that may be less carcinogenic and less toxic than chromate corrosion inhibitors.

SUMMARY OF THE INVENTION

The present invention provides for a slow-release corrosion inhibitor that may replace current chromate corrosion inhibitors, as well as other type inhibitors, and is applied as a coating to a metal surface, such as by way of a paint or primer coating, for corrosion control of the metal.

An exemplary embodiment of the slow-release corrosion inhibitor includes a water-soluble pigment, i.e. a water-soluble particle, and a polymeric film that encapsulates the particle. This water-soluble particle may be either organic or inorganic and, preferably, is non-carcinogenic and non-toxic. The organic particle advantageously includes an azole, more advantageously, triazole or derivatives thereof, and most advantageously, tolytriazole, benzotriazole, and 1,2,4-triazole. The inorganic particle advantageously includes a rare earth metal, Group V element, or salt thereof. More advantageously, the rare earth metal is cerium or a salt thereof, and most advantageously, cerium acetate while the Group V element, more advantageously, is vanadium or a salt thereof, and most advantageously, sodium metavanadate.

An organic monomer precursor, such as pyrrole, perfluorohexane, octafluorotoluene, or acetylene, is selected for the polymeric film, which is formed by a plasma polymerization process commonly known in the art. The addition of the polymeric coating to the particle controls the high solubility thereof by increasing the hydrophobicity, i.e. decreasing the hydrophilicity, of the particle, thereby providing a corrosion-inhibiting pigment, or corrosion inhibitor, that is hydrophobic in nature. Accordingly, it should be understood that any multitude of organic monomers having sufficient hydrophobicity may be used in the formation of the polymeric coating. In addition, the organic polymeric film provides a desired permeability to permit controlled diffusion of the particle material, i.e. particle ions, through the film upon interaction of the particle with water, thereby inhibiting the corrosion process on the surface of a metal. This controlled release property appears to be essential when the corrosion inhibitor is to be incorporated into organic coatings, e.g. paints and primer coatings.

Additional organic polymeric films may be applied over the first film to further encapsulate the inorganic particle. Advantageously, a second organic polymeric film encapsulates the first organic polymeric film wherein the second film is less hydrophobic than the first polymeric film. Accordingly, each of the first and second films is of a desired permeability to permit controlled diffusion of particle ions therethrough upon interaction of the particle with water, thereby inhibiting corrosion on the surface of a metal.

In another exemplary embodiment, the slow-release corrosion inhibitor further includes a water-soluble organic compound. The water-soluble organic compound acts as a surface stabilizer for the inhibitor and may include an azole, advantageously, triazole or a derivative thereof, and more advantageously, tolytriazole, benzotriazole, and 1,2,4-triazole. The water-soluble compound and particle with polymeric coating advantageously is combined in a 1:1 ratio by weight to form the corrosion inhibitor and, more specifically, the corrosion-inhibiting pigment. However, it should be understood that other suitable ratios may be employed, for example, 1:2 and 1:3, etc. and vice-versa.

In yet another exemplary embodiment, the slow-release corrosion inhibitor includes the water-soluble organic compound, a first water-soluble particle, and a second water-soluble particle different than the first particle. Advantageously, the first and second water-soluble particles are inorganic particles, more advantageously, the first particle is the rare earth metal or salt thereof, such as cerium acetate, and the second particle is the Group V element or salt thereof, such as sodium metavanadate. First and second polymeric films, respectively, encapsulate the first and second particles. The above described organic monomer precursor similarly is selected for providing the first and second polymeric films, which are applied by the plasma polymerization process. The first and second polymeric films provide the desired permeability to permit controlled diffusion of the first and second particle ions therethrough upon interaction of the particles with water, thereby inhibiting corrosion on the surface of a metal. The water-soluble compound, first particle with polymeric coating, and second particle with polymeric coating advantageously are combined in a 1:1:1 ratio by weight to form the corrosion inhibitor.

By virtue of the foregoing, there is thus provided a corrosion inhibitor for corrosion control of a metal that may replace chromate corrosion inhibitors and may be added to a paint or primer coating and applied as a coating onto a metal surface for corrosion control of the metal.

The features and objectives of the present invention will become more readily apparent from the following Detailed Description taken in conjunction with the accompanying drawing.

BRIEF DESCRIPTION OF THE DRAWING

The accompanying drawing, which is incorporated in and constitute a part of this specification, illustrates embodiments of the invention and, together with a general description of the invention given above, and the detailed description given below, serves to explain the invention.

The drawing is a front elevational view of the plasma reactor of the present invention.

DETAILED DESCRIPTION

The slow-release corrosion inhibitor of the present invention may replace current chromate corrosion inhibitors, as well as other type inhibitors, and is applied to a metal surface, such as by way of a paint or primer coating, for corrosion control of the metal, e.g. aluminum, iron, copper, steel including galvanized steel, alloys thereof, and the like. The corrosion inhibitor is less carcinogenic and less toxic than chromate inhibitors, advantageously, non-carcinogenic and non-toxic.

One exemplary embodiment of the slow-release corrosion inhibitor of the present invention includes a water-soluble pigment, i.e. water-soluble particle, and a polymeric film encapsulating the particle. The water-soluble particle may be either organic or inorganic. The organic particle may include an azole, more advantageously, triazole or a derivative thereof, and most advantageously tolytriazole, benzotriazole, and 1,2,4-triazole. The inorganic particle advantageously includes a rare earth metal, i.e. a lanthanide or actinide, Group V (or Vb) element, or salt thereof. More advantageously, the rare earth metal is cerium or a salt thereof, and most advantageously, cerium acetate while the Group V element, more advantageously, is vanadium or a salt thereof, most advantageously, sodium metavanadate.

Specifically, triazole compounds, as well as rare earth metals and their salts, e.g. cerium acetate, are believed to be effective for preventing corrosion of metals, for example, aluminum, iron, copper, steel including galvanized steel, alloys thereof, and the like, by inhibiting the cathodic reaction of the corrosion process. The Group V elements and their salts similarly are believed to be effective for preventing corrosion of these metals, and work by inhibiting the anodic reaction of the corrosion process. Unlike chromate inhibitors, these organic and inorganic particles are not adequate for use alone, for example, in water-based paints or primer coatings, because of their high solubility. As such, these particles are coated by a monomer precursor to provide the encapsulating polymeric film.

The precursor, advantageously, is an organic monomer that can include pyrrole, perfluorohexane, octafluorotoluene, or acetylene, which is applied to the particle by a plasma polymerization process commonly known in the art and further explained below. The organic monomer is more hydrophobic than the water-soluble particle and produces a hydrophobic polymeric film having a desired permeability to permit controlled diffusion of the particle ions upon interaction of the particle with water. This controlled, or slowed, diffusion inhibits corrosion on the metal surface of the metal when the corrosion inhibitor is applied thereto.

The rate of diffusion of the particle, i.e. particle ions, through its respective polymeric film(s) upon interaction with water, as well as the initial diffusion of water through the polymeric film(s), generally is controlled by the selection of the organic monomer and/or the plasma polymerization conditions. Notably, the degree of hydrophobicity of the polymeric film can severely limit or permit diffusion of water and, thus, the interaction of the water with the water-soluble particle, thereby controlling the diffusion, or leaching, rate of the particle therethrough. It should be understood that any variety of organic monomer of sufficient hydrophobicity and permeability may be used to create the desired rate of diffusion of the particle.

The plasma polymerization process mentioned above includes use of the plasma reactor 10 shown in the drawing. This plasma reactor 10 generally includes a vacuum chamber 12 consisting of a Pyrex glass column, advantageously, 55 cm in height and 6 cm in internal diameter. The vacuum chamber 12 is closed off at a terminal end by a metal panel 14. The water-soluble particles 16, usually in powder form, may be placed on the bottom of a glass flask 18 to be stirred by a magnetic stirrer bar 20 controlled by a stirrer 22 to expose the particles 16 uniformly to the plasma (not shown). The flask 18 is connected to a vacuum pump (not shown), advantageously a Welch Vacuum having model #1402B-01 available from Thomas Industries Inc. The system pressure is measured by a vacuum gauge 24, advantageously, a Denton Vacuum Gauge having model #DV-515.

With further reference to the drawing, monomer precursors (not shown) are introduced into the reactor 10 from the monomer inlet 26. When a liquid monomer is used for plasma polymerization, a cylinder (not shown) is directly connected to the monomer inlet 26. The desired monomer pressure is obtained by subtracting the base pressure from the total system pressure and by controlling the total system pressure. When a gas is used as the monomer for plasma polymerization, a mass flow meter (not shown) is applied between the monomer cylinder and the monomer inlet 26 to more accurately adjust the monomer flow rate. The power system 28 consists of an RF generator 30 (shown in block) having model #LTA-302.

Before plasma treatment, the base pressure is pumped down to around 5 Pa, then the desired monomer is introduced into the vacuum chamber 12 and power applied. Once the monomer is ionized, excited gas species react with the surface of the powdered particles 16 while being vigorously stirred. As a result, the organic monomer encapsulates the water-soluble particle with the polymeric film. The polymeric film includes a desired thickness and has a desired permeability to permit controlled diffusion of the particle ions upon interaction with water.

One or more additional organic polymeric films may be applied over a first polymeric film to further encapsulate the inorganic particle. Advantageously, a second organic polymeric film encapsulates the first organic polymeric film wherein the second film is less hydrophobic than the first polymeric film. Accordingly, each of the first and second films are of a desired permeability to permit controlled diffusion of the particle ions therethrough upon interaction of the particle with water. Advantageously, the first and second polymeric films, respectively, are formed from the monomer precursors perfluorohexane and pyrrole.

In another exemplary embodiment of the present invention, the slow-release corrosion inhibitor further includes a water-soluble, organic compound such as an azole, more advantageously, triazole or derivatives thereof, and most advantageously, tolytriazole, benzotriazole, and 1,2,4-triazole, along with the water-soluble particle. The water-soluble, organic compound acts as a stabilizer for the inhibitor, and more specifically, to enhance surface adhesion properties of the polymeric coated particle. The water-soluble particle may include the water-soluble inorganic or organic particle, as already described above. Advantageously, in this embodiment the water-soluble particle is an inorganic particle, more advantageously, a rare earth metal or salt thereof, most advantageously, cerium acetate. Again, the organic monomer precursor, such as pyrrole, perfluorohexane, octafluorotoluene, or acetylene, is chosen for the hydrophobic polymeric film to provide a desired permeability to permit controlled diffusion of the particle ions upon interaction of the particle with water, thereby inhibiting corrosion of the metal surface when the inhibitor is applied thereto. The water-soluble compound and particle with polymeric coating advantageously is combined in a 1:1 ratio by weight to form the corrosion inhibitor. It should be understood that other suitable ratios may be employed, for example, 1:2, 1:3, 2:1, 3:1, etc.

In yet another exemplary embodiment, the slow-release corrosion inhibitor includes the water-soluble organic compound, a first water-soluble particle, and a second water-soluble particle different than the first particle. The water-soluble organic compound again may include an azole, advantageously, triazole or derivatives thereof, more advantageously, tolytriazole, benzotriazole, and 1,2,4-triazole. The first and second water-soluble particles again may include water-soluble inorganic and/or organic particles, as already described above. Advantageously, the first and second water-soluble particles are inorganic particles, more advantageously, the first particle is a rare earth metal or salt thereof, such as cerium acetate, and the second particle is a Group V element or salt thereof, such as sodium metavanadate.

First and second polymeric films, respectively, encapsulate the first and second particles. An organic monomer precursor, such as pyrrole, perfluorohexane, octafluorotoluene, or acetylene, similarly is selected to provide the first and second polymeric films, which again are applied by the plasma polymerization process. The first and second polymeric films provide a desired permeability to permit controlled diffusion therethrough of the first and second particle ions upon interaction of the particles with water to inhibit corrosion of the metal surface. The first and second polymeric films may include the same or different monomer precursors. In addition, the water-soluble compound, first particle with polymeric coating, and second particle with polymeric coating advantageously are combined in a 1:1:1 ratio by weight to form the corrosion inhibitor. However, it should be understood that other suitable ratios may be employed, for example, 1:1:2, 1:1:3, 1:2:1, 1:3:1, etc.

The above describe slow-release corrosion inhibitors are used to coat metal surfaces, which may include aluminum, iron, copper, steel including galvanized steel, alloys thereof, and the like. These slow-release inhibitors may be applied as a coating onto the metal surfaces, such as by way of paint or a primer coating, to control corrosion of the metal. More specifically, the corrosion inhibitor simply is added to the paint or primer coating. The primer coating may include a water-based epoxy, and the like, or a superprimer. The superprimer is disclosed and described in PCT Publication No. WO 2004/009717, titled "Superprimer," which is hereby fully incorporated by reference herein. The pH ranges of the paint or primer coating may be adjusted further to provide greater control over the release of the particle ions across the permeable, polymeric coatings.

In the following examples, various particle materials are coated with a variety of monomer precursors to illustrate the effectiveness of the above described corrosion inhibitors. The experimental corrosion inhibitors then are dispersed into a water-based epoxy coating, i.e. primer coating, and applied onto metal surfaces for testing.

Experimental Materials

AA2024-T3 panels, which are aluminum alloy panels, were obtained from ACT Laboratories, Inc. of Hillsdale, Mich. for coating in the following examples. Before use, the panels were cleaned ultrasonically in acetone for 5 minutes, ultrasonically in ethyl alcohol for 10 minutes, and then in 7 wt. % alkaline solution (CHEM Clean 1055) at 65-70° C. for 5 minutes, rinsed using DI water, and dried using compressed air.

Barium chromate ($BaCrO_4$) having a purity of 98+% was used as a control and is available from Aldrich Chemical Company, Inc. of Milwaukee, Wis. In addition, three organic corrosion inhibitors were prepared using the following organic particles: tolytriazole, or TTA, ($C_7H_7N_3$, purity >99%) available from PMC Specialties Group, Inc. of Cincinnati, Ohio, and benzotriazole, or BTA, ($C_6H_5N_3$, purity: 99%), and 1,2,4-triazole, or TA, ($C_2H_3N_3$, 98%) both available from Aldrich Chemical Company, Inc. of Milwaukee, Wis. All particles were used without further purification.

The monomers used to form the polymeric films in the corrosion inhibitors were perfluorohexane ($C_6F_{14}$, purity: 99%) and pyrrole ($C_4H_5N$, purity: 98%) available from Aldrich Chemical Company, Inc. of Milwaukee, Wis., and acetylene ($C_2H_2$, purity: 99.6%) available from Aga Gas Inc. of Cleveland, Ohio.

The prepared corrosion inhibitors were mixed with an epoxy resin and a curing agent to test their anti-corrosion properties. The epoxy resin was Shell EPOn Resin 828 available from Miller-Stephenson Chemical Co., Inc. of Sylmar, Calif., and the curing agent was EPI-Cure 8290-Y-60 Curing Agent available from Resolution Performance Products of Houston, Tex.

Plasma Treatment Reactor and Plasma Polymerization

The corrosion inhibitors were prepared by the plasma polymerization process, as is commonly known in the art and generally described above, using the plasma reactor of the drawing. The plasma treatment conditions are shown in Table 1 below. Samples 4 and 6 were double-layer treated, where the inner layer was deposited from perfluorohexane and the outer layer was pyrrole.

TABLE 1

Conditions of Plasma Polymerization

| | | | | Sample No. | | | | |
|---|---|---|---|---|---|---|---|---|
| | 1 | 2 | 3 | 4 | | 5 | 6 | |
| | | | | Particle | | | | |
| | | | | TTA (tolytriazole) | | | TA (1,2,4-triazole) | |
| | TTA | TTA | TTA | Inner Layer | Outer Layer | BTA (benzotriazole) | Inner Layer | Outer Layer |
| Monomer | $C_2H_2$ | $C_6F_{14}$ | $C_6F_{14}$ | $C_6F_{14}$ | $C_4H_5N$ | $C_6F_{14}$ | $C_6F_{14}$ | $C_4H_5N$ |
| Initial weight (g) | 10 | 10 | 10 | 10 | 10 | 10 | 10 | 10 |
| Base pressure (Pa) | 5 | 5 | 5 | 5 | 5 | 5 | 5 | 5 |
| Monomer pressure (Pa) | 50 | 50 | 50 | 50 | 40 | 50 | 50 | 40 |
| Input powder (W) | 30 | 80 | 80 | 80 | 40 | 80 | 80 | 40 |
| Treatment time (min) | 60 | 60 | 15 | 60 | 60 | 30 | 15 | 15 |

Corrosion Inhibition of AA2024-T3 by Tolyltriazole (TTA)

Different concentrations of TTA from 0-2000 ppm were added to a 3.5 wt. % NaCl solution. Five cleaned AA2024-T3 panels were introduced vertically into each solution and immersed for 5 hours. A DC polarization technique, commonly known in the art, was used to test the immersed panels. A commercial saturated calomel electrode (SCE) and a platinum mesh were used as the reference and counter electrodes, respectively. The area exposed to the electrolyte was 0.78 cm$^2$. The data was recorded over the range of $E_{corr} \pm 250$ mV where $E_{corr}$ is the equilibrium corrosion potential. The scan rate was 1 mV/s.

Three replicate panels were measured for each type of solution. Polarization curves of AA2024-T3 in 3.5 wt. % NaCl solution without and with 200-1000 ppm TTA were prepared. With the increase of concentration of TTA, the polarization curves shifted from right to left and the corrosion currents decreased. Therefore, the higher the concentration of TTA, the higher the corrosion inhibition. In addition, since TTA is useful as a cathodic corrosion inhibitor for AA2024-T3, the shift only affected the cathodic polarization curves. The lowering of $E_{corr}$ with inhibitor concentration confirms the predominantly cathodic activity.

Release Rate Test

The plasma-treated organic corrosion inhibitors were added to the 3.5 wt. % NaCl solution and stirred by a magnetic stirrer continuously. Every 24 hours, fresh AA2024-T3 panels were immersed into the solution for 1 hour and then tested by DC polarization. The other conditions of the DC polarization test were the same as those of the corrosion inhibition test with untreated corrosion inhibitors.

DC polarization curves for AA2024-T3 in 3.5 wt. % NaCl solution with plasma-treated organic corrosion inhibitors (Samples 1, 2, and 3) were prepared. For each sample, the polarization behavior for a fresh AA2024-T3 panel in the solution was shown to be a function of exposure time. Again, the curves shifted to lower currents with longer stirring time. Thus, the corrosion current of the panels decreased to indicate that the organic corrosion inhibitor was slowly released from the plasma polymer films with longer immersion time.

Accordingly, the concentration of particle ions in the solution thus increased and the corrosion-inhibiting property of the solution improved. When comparing Samples 2 and 3, where the corrosion inhibitor was TTA plasma-treated by perfluorohexane for 1 hour and 15 minutes, respectively, it is seen that the release rate in Sample 3 is faster than that in Sample 2. Accordingly, longer plasma treatment deposited a thicker polymeric film causing a less permeable membrane resulting in a slower release rate. Samples 1 and 2 were 1-h plasma-treated by acetylene and by perfluorohexane, respectively. The release rate of the former is faster than that of the latter, which suggests that plasma-polymerized perfluorohexane creates a more hydrophobic polymeric film than plasma-polymerized acetylene.

Characterization of Plasma-Treated Organic Corrosion Inhibitors

After the plasma treatment, the polymeric films were examined by infrared spectroscopy (FTIR), time-of-flight secondary ion mass spectrometry (TOFSIMS), scanning electron microscopy coupled with energy dispersive X-ray spectroscopy (SEM/EDX), transmission electron microscopy (TEM), and a Lesca dynamic wicking meter.

FTIR and TIFSIMS

The IR spectra of untreated TTA, Sample 1, and Sample 2 were acquired on a BIO-RAD FTS-40 FTIR spectrometer. The spectra were obtained using a resolution of 8 cm$^{-1}$ and were averaged over 256 scans. The IR spectra revealed that plasma polymerized acetylene was formed on the surface of TTA in Sample 1 while plasma polymerized perflurohexane was formed on the surface of TTA in Sample 2.

TOSFIMS spectra also were recorded of untreated and plasma-treated organic corrosion inhibitors (Samples 2, 3 and 6). TOFSIMS analysis was performed on a CAMECA ION-TOF spectrometer. This instrument is equipped with a reflectron-type time-of-flight mass analyzer and a pulsed 25 kV primary source of monoisotopic $^{69}$Ga$^+$ ions, with a minimum beam size of 50 nm. Negative SIMS spectra of plasma-treated TTA (Sample 2) showed peaks of F—, $C_2$F—, CF2-, and CF3-, which confirms the formation of plasma polymerized perfluorohexane on the surface. The positive spectra of Samples 2 and 3 revealed a high intensity CF3-ion indicating that longer treatment time forms thicker polymeric films. Lastly, the first and second polymeric film layers of Sample 6 confirm the peaks of both plasma polymerized perflurohexane and pyrrole.

SEM and EDX Characterization

SEM/EDX was performed on a Hitachi S-900 scanning electron microscope using 3 kV acceleration voltage. The polymeric films were observed clearly and the thickness was measured. High and low magnification SEM images of untreated and treated plasma-treated benzotriazole of Sample 5 revealed that untreated benzotriazole powder has a smooth surface while Sample 5 revealed plasma-roughening. More specifically, the polymeric coating of Sample 5 has a rough and cauliflower-like surface. In addition, the average particle size of the corrosion inhibitors was estimated to be around 20 μm. EDX spectra of untreated and plasma-treated TTA (Sample 2) further revealed the presence of the element F in Sample 2 indicating the formation of the polymeric film.

Contact Angle Measurement

The weight of the penetrating water into an untreated and plasma-treated corrosion inhibitors (Samples 1-6) column, and barium chromate powder column was evaluated as a function of the water contact time by using a Lesca dynamic wicking meter. The contact angle between the powder and water can be calculated by measuring the penetration rate of water into a tapped column of particles. The principle of the dynamic wicking meter, as well as the specific experimental procedures associated therewith, is commonly known and understood in the art. The contact angles of water for each powder are shown in Tables II-V.

TABLE II

Wicking Properties of Untreated and Plasma-Treated Tolytriazole

| Powder | Porosity of powder column | Total weight of penetrating water (g) | Contact angle of water (deg) |
|---|---|---|---|
| Untreated tolytriazole | 0.413 | 0.95 | 13 |
| Sample 1 | 0.337 | 0.17 | 54 |
| Sample 2 | 0.377 | 0 | >90 |
| Sample 3 | 0.377 | 0.05 | 90 |
| Sample 4 | 0.315 | 0.17 | 52 |

TABLE III

Wicking Properties of Untreated and Plasma-Treated Benzotriazole

| Powder | Porosity of powder column | Total weight of penetrating water (g) | Contact angle of water (deg) |
|---|---|---|---|
| Untreated benzotriazole | 0.532 | 0.57 | 70 |
| Sample 5 | 0.337 | 0 | >90 |

TABLE IV

Wicking Properties of Untreated and Plasma-Treated Triazole

| Powder | Porosity of powder column | Total weight of penetrating water (g) | Contact angle of water (deg) |
|---|---|---|---|
| Untreated triazole | 0.278 | 0.22 | 0 |
| Sample 6 | 0.440 | 0.2 | 87 |

TABLE V

Wicking Properties of Barium Chromate

| Powder | Porosity of powder column | Total weight of penetrating water (g) | Contact angle of water (deg) |
|---|---|---|---|
| Barium chromate | 0.717 | 0.19 | 90 |

The untreated TTA revealed a high rate of water penetration, while Sample 2 showed no water penetration. Samples 1, 3, and 4 showed low water penetration, which indicated that the hydrophobicity of TTA was increased after plasma treatment. The contact angles of Sample 2 could not be calculated because there was no penetration of water, so it was expected to be more than 90°. In addition, the hydrophobicity of BTA and TA appears to be increased after plasma treatment. The contact angle of Sample 5 was more than 90° for the same reason as that for Sample 2. Since TA dissolved easily in water, the penetration of water could not be measured correctly and the contact angle could not be calculated. It was estimated to be around 0°. The contact angle of barium chromate was calculated to be around 90°.

Deposition Rate on a Flat Substrate

Laser interferometry was applied to measure the deposition rate using a HeNe red line (wavelength: $\lambda=632.8$ nm) on a silicon substrate (2 cm×4 cm). Two reflected beams from the surface of the deposited film and that of the underlying substrate, i.e. particle, respectively, interfered with each other to generate a periodical pattern depending on the path difference. Through the recorded maximum and minimum detector voltages and the periodical time of the detector voltage changes (t, min), the deposition rate of the film on the silicon substrate was calculated using the following equations:

$$r=R_m/R_M \qquad (1)$$

$$x=(n_2+1)/[r^{0.5}(n_2-1)] \qquad (2)$$

$$n_1=[n_2(x-1)/(x+1)]^{0.5} \qquad (3)$$

$$D(/\min)=\lambda/(2n_1 t) \qquad (4)$$

Where $R_m$ is the minimum detector voltage, $R_M$ is the maximum detector voltage, $n_1$ is the refractive index for the deposited polymeric film, $n_2$ is the refractive index for Si, $n_2=3.86$, D is the deposition rate of the film.

Deposition Rate Evaluation

Inhibitor TEM images of plasma-treated TTA by perfluorohexane (Sample 2) for 1 hour were observed. TEM was performed on a JEOL JEM-2000FX electron microscope equipped with a $LaB_6$ gun. The TEM images showed the TTA particles, i.e. the surfaces of the TTA powders, to be completely and uniformly covered by the plasma polymerized perfluorohexane. The thickness of the perfluorohexane film was measured to be 4 nm after 1 hour of plasma polymerization duration. The average deposition rate of plasma polymerized perfluorohexane film onto TTA powders, therefore, is approximately 0.07 nm/min. Compared to the deposition rate of plasma polymerized perfluorohexane on silica wafer at the same conditions, which is around 7 nm/min as determined by laser interferometry, the deposition rate of plasma polymer film on powders is around two orders of magnitude lower. Several factors may contribute to such a difference.

First, powders were characterized by a large specific surface area while a flat substrate has limited surface area. The specific surface area for a 1 gram powder with an average particle size of 20 μm and density of 2000 kg/m³ is calculated to be around 0.15 m², which is two orders of magnitude larger than that of a flat substrate. Assuming the same plasma polymerization condition, the same total amount of film is deposited per unit of time, the thickness of the film deposited on powders will be much lower than that on flat substrates.

Second, the length of time the substrate surface is exposed to the plasma differs. For a plasma polymerization process, the flat surface substrate exposes its surface to the plasma phase throughout the process duration, allowing deposition of the polymeric film on its surface. In contrast, powdered substrates, i.e. particles, expose part of their surface to the plasma periodically, depending on the shape, surface roughness of the powders, and the mixing efficiency. Therefore, the average time for each powder particle to contact the plasma phase is much shorter than the total process duration.

Third, since the nature of treatment of powdered materials involves mixing the particles to continuously refresh surfaces exposed in the plasma, the stability of plasma in the chamber is affected by interactions between the particles and the plasma. Particles may directly absorb energy or they could collide with excited gas species and reduce the electron density. In contrast, these effects are much less in the case of plasma polymerization on flat substrates.

Lastly, exhaustion of the monomer precursor close to the powder surfaces is another important factor affecting the film deposition rate. Due to the large surface area, the monomer concentration around the powder surface is much lower than compared to flat surface, assuming that deposition conditions are the same. The growth of the plasma polymer film on the powder surface is slowed down because the monomer and radicals around the particle surface are depleted and exhausted. As such, diffusion becomes rate-determining in the reactor.

The Immersion Test of Water-Based Epoxy Coated Panels

An epoxy coating was made with the ratio: epoxy/curing agent=1/1.6. The resin was mixed with 20 wt. % Dl water. Untreated and plasma-treated corrosion inhibitors (Samples 2 and 5) and barium chromate were added to the water-based epoxy coating by stirring for 10 min. at the level of 1 wt. %. It should be understood that up to about 10 wt % and greater may be mixed with the epoxy coating. In addition, water-based paints similarly may be used in place of water-based epoxy coatings. Solvent-based, rather than water-based, paint and epoxy systems equally may be considered.

$BaCrO_4$ powder served as the control and an epoxy coating without pigments was also tested. The epoxy resins without and with pigments were applied on cleaned AA2024-T3 panels and dried at 60° C. for 2 hours. More specifically, the AA2024-T3 panels were coated by epoxy without pigments, epoxy with $BaCrO_4$, epoxy with plasma-treated TTA (Sample 2), epoxy with untreated TTA, epoxy with plasma-treated BTA (Sample 5), and epoxy with untreated BTA. After curing, the thickness of the coatings was measured to be around 60 μm by a thickness gauge. Then, the coated side of the panels was scribed by a carbide tip. Two lines about 2.5 cm in length and 45° angle between them were scribed in the coated panels. The edges and the uncoated side of the panels were sealed by wax. The panels were then immersed in Dl water or 3.5 Wt. % NaCl solution.

Immersion Test

A comparison was made of the epoxy-coated panels before immersion and after 30 days of immersion in the Dl water and NaCl solution. After 30 days of immersion in Dl water, the epoxy-coated panels containing the corrosion inhibitors from Samples 2 and 5, i.e. the epoxy with plasma-treated TTA and BTA, did not show any surface blistering, or corrosion, while the panels with the untreated TTA and BTA particles showed a number of blisters. As such, the untreated TTA, i.e. lacking a polymeric film, was much more hydrophilic and water soluble than the plasma-treated TTA (Sample 2).

After 30 days of immersion in the NaCl solution, the control panel was corroded heavily while almost no corrosion appeared in the epoxy-coated panels containing the corrosion inhibitors from Samples 2 and 5. In addition, the epoxy-coated panel containing the corrosion inhibitors from Samples 2 showed less corrosion that the epoxy with $BaCrO_4$ indicating that the coating with the plasma-treated TTA is more corrosion-resistant than the chromate pigment. Also, it was determined that the primer coatings with plasma-treated inhibitors (Samples 2 and 3) showed less corrosion than those with untreated inhibitors.

Additional Corrosion Inhibitor Examples

In the following additional examples, the water-soluble particle, cerium acetate, is coated with a monomer precursor and also combined with a water soluble, organic compound, advantageously in a 1:1 ratio by weight. The corrosion inhibitor then is dispersed into a water-based superprimer system, or coating, and applied onto metal surfaces for testing to further illustrate the effectiveness of the slow-release corrosion inhibitor of the present invention. The superprimer coating, disclosed and described in PCT Publication No. WO 2004/009717, titled "Superprimer," is hereby fully incorporated by reference herein.

For preparation of the corrosion-inhibiting pigment, the cerium acetate was coated with the organic monomer precursor octafluorotoluene (OFT) via the plasma polymerization process as described above to form a polymeric coating. More specifically, 10 grams of the desired particle was placed in the bottom of the flask of the plasma reactor. The reactor was pumped down to 6 Pa then the monomer was introduced until the pressure reading was 46 Pa. The plasma was generated at a power of around 80 W. The particles were coated for one hour while the magnetic stirrer continuously stirred the particles.

As indicated above, the prepared corrosion inhibitor was evaluated in a superprimer coating which contained ECO-CRYL:WD-510:bis-[3-(triethoxysilylpropyl)]ethane (BTSE) in a weight ratio of 7:3:2. ECO-CRYL is an acrylic resin dispersion and EPI-REZ WD-510 is a water reducible epoxy resin both available from Resolution Performance Products. The ECO-CRYL:WD-510 ratio of 7:3 may vary, for example, 5:4, 6:4, 5:3, 6:3, while the weight of silane is maintained constant at 2 parts by weight, diluted with water as per primer or painting requirements. 1% by weight of the corrosion inhibitor was added to the superprimer coating for testing thereof.

Three compositions specifically were tested: a control, i.e. the superprimer coating alone, the superprimer plus a corrosion inhibitor including cerium acetate having the plasma polymerized octafluorotoluene coating (Sample 2), and the superprimer coating plus a corrosion inhibitor including cerium acetate having the plasma polymerized octafluorotoluene coating and untreated benzotriazole (BTA), i.e. the water-soluble organic compound (Sample 3). The untreated BTA and plasma-coated particle are mixed in a 1:1 by weight ratio to form the corrosion inhibitor. The test compositions similarly were applied to AA2024-T3 panels.

An Electrochemical Impedance Spectroscopy (EIS) test, commonly known in the art, was performed on each of the coated panels (control and Samples 2-3) by evaluating the coating during immersion of the panels in a 0.6M NaCl solution. The control coating failed after 11 days of immersion in the salt solution. Sample 2 showed little change after 17 days of immersion in the solution indicating that the polymeric coating is quite hydrophobic. Finally, Sample 3 showed little change in the first 14 days however, on the $17^{th}$ day, the modulus increased indicating that slow release of the particle is in effect. The coated panels were further visually evaluated after salt water immersion. Sample 3 showed comparatively less corrosion on the area exposed to 0.6M NaCl solution for 17 days as compared to the control as well as compared to Sample 2.

In a further example, a water-soluble particle, sodium metavanadate ($NaVO_3$) available from Alfa-Aesar, was coated with the monomer precursor octafluorotoluene (OFT)

by plasma polymerization in the same manner as the cerium acetate described above. The coated particle was further combined with the cerium acetate having the plasma polymerized octafluorotoluene coating and untreated benzotriazole (BTA), i.e. the water-soluble organic compound, in a ratio of 1:1:1 by weight to produce a corrosion inhibitor. It should be understood that the 1:1 by weight ratio of the polymeric coated cerium acetate:polymeric coated sodium vanadate may be varied, for example, to include a ratio of 1:2, 1:3, 2:1, 3:1, etc. The ratio of the BTA may be varied but generally would remain as 1. 1% by weight of this corrosion inhibitor then was added to the superprimer coating (Sample 4) for testing thereof along with the control.

The test compositions were applied to AA2024-T3 panels. The coated panels were tested and visually evaluated after salt water immersion in a 0.6M NaCl solution. Sample 4 showed less corrosion on the area exposed to 0.6 M NaCl solution for 14 days as compared to the control, which was highly corroded throughout. In addition, SEM micrographs of a scribed surface of a coated panel containing Sample 4 showed a distinct film layer in the scribe after 14 days of exposure to the 0.6 M NaCl solution. Also, an EDS spectrum of the scribe after exposure to 0.6 M NaCl solution for 14 days showed the presence of vanadate and cerium in the scribe.

Notably, in the above examples, water-soluble particles, both organic and inorganic, were successfully plasma-treated by various organic monomers with the resulting corrosion inhibitors being shown to slowly release particle ions across the polymeric membranes and effectively inhibit corrosion on a metal surface. These slow-release corrosion inhibitors may be used to replace current chromate corrosion inhibitors, as well as other type inhibitors. Accordingly, the corrosion inhibitors of the present invention can be applied as a coating or film onto a metal surface, such as by way of a paint or primer coating, for corrosion control of a metal, e.g. aluminum, iron, copper, steel including galvanized steel, alloys thereof, and the like.

While the present invention has been illustrated by the description of the various embodiments thereof, and while the embodiments have been described in considerable detail, it is not intended to restrict or in any way limit the scope of the appended claims to such detail. Additional advantages and modifications will readily appear to those skilled in the art. The invention in its broader aspects is therefore not limited to the specific details, representative apparatus and methods and illustrative examples shown and described. Accordingly, departures may be made from such details without departing from the scope or spirit of Applicants' general inventive concept.

What is claimed is:

1. A slow-release inhibitor composition for corrosion control of a metal, consisting of:
    an undissolved, first water-soluble particle encapsulated by a first organic polymeric film, the first polymeric film being of a desired hydrophobicity and permeability to permit, upon interaction of the particle with water, controlled diffusion of particle ions therethrough; and
    a non-encapsulated, water-soluble organic compound which defines a surface stabilizer for the inhibitor composition.

2. The slow-release inhibitor composition of claim 1 wherein the water-soluble particle includes a water-soluble inorganic particle.

3. The slow-release inhibitor composition of claim 2 wherein the water-soluble inorganic particle includes one of a rare earth metal or salt thereof and Group V element or salt thereof.

4. The slow-release inhibitor composition of claim 1 wherein the first organic polymeric film includes a hydrophobic monomer precursor.

5. A slow-release inhibitor composition for corrosion control of a metal, consisting of:
    an undissolved, first water-soluble particle encapsulated by a first organic polymeric film, the first polymeric film being of a desired hydrophobicity and permeability to permit, upon interaction of the particle with water, controlled diffusion of particle ions therethrough;
    a non-encapsulated, water-soluble organic compound which defines a surface stabilizer for the inhibitor composition;
    an undissolved, second water-soluble particle different than the first water-soluble particle; and
    a second organic polymeric film encapsulating the second water-soluble particle, the second polymeric film being of a desired hydrophobicity and permeability to permit, upon interaction of the particle with water, controlled diffusion of particle ions of the second water-soluble particle therethrough.

6. The slow-release inhibitor composition of claim 5 wherein the first particle includes a first water-soluble inorganic particle and the second particle includes a second water-soluble inorganic particle.

7. The slow-release inhibitor composition of claim 6 wherein the first inorganic particle includes a rare earth metal or salt thereof and the second inorganic particle includes a Group V element or salt thereof.

8. The slow-release inhibitor composition of claim 6 wherein the first inorganic particle includes cerium or a salt thereof and the second inorganic particle includes vanadium or a salt thereof, the water-soluble organic compound includes an azole, and the first and second polymeric organic films include a hydrophobic monomer precursor.

9. The slow-release inhibitor composition of claim 8 wherein cerium or a salt thereof includes cerium acetate, vanadium or a salt thereof includes sodium metavanadate, and the azole includes triazole or a derivative thereof.

10. A slow-release inhibitor composition for corrosion control of a metal, comprising:
    a water-soluble particle; and
    a first organic polymeric film encapsulating the water-soluble particle and a second organic polymeric film encapsulating the first organic polymeric film, the second polymeric film being less hydrophobic than the first polymeric film, each of the first and second films being of a desired hydrophobicity and permeability to permit, upon interaction of the particle with water, controlled diffusion of particle ions therethrough, wherein the first and second polymeric films being plasma polymerized and are comprised of an organic monomer precursor selected from pyrrole, perfluorohexane, octafluorotoluene, or acetylene.

11. A slow-release inhibitor composition for corrosion control of a metal, comprising:
    a first water-soluble particle encapsulated by a first organic polymeric film, the first polymeric film being plasma polymerized and of a desired hydrophobicity and permeability to permit, upon interaction of the particle with water, controlled diffusion of particle ions therethrough; and
    a non-encapsulated, water-soluble organic compound which defines a surface stabilizer for the inhibitor composition.

12. The slow-release inhibitor composition of claim 11 wherein the water-soluble particle includes a water-soluble inorganic particle.

13. The slow-release inhibitor composition of claim 12 wherein the water-soluble inorganic particle includes one of a rare earth metal or salt thereof and Group V element or salt thereof.

14. The slow-release inhibitor composition of claim 11 wherein the first organic polymeric film includes a hydrophobic monomer precursor.

15. The slow-release inhibitor composition of claim 11 wherein the first organic polymeric film is comprised of plasma polymerized pyrrole, perfluorohexane, octafluorotoluene, or acetylene monomers.

16. The slow-release inhibitor composition of claim 11 further comprising:
  a second water-soluble particle different than the first water-soluble particle; and
  a second organic polymeric film encapsulating the second water-soluble particle, the second polymeric film being a plasma polymerized film of a desired hydrophobicity and permeability to permit, upon interaction of the particle with water, controlled diffusion of particle ions of the second water-soluble particle therethrough.

17. The slow-release inhibitor composition of claim 16 wherein the first particle includes a first water-soluble inorganic particle and the second particle includes a second water-soluble inorganic particle.

18. The slow-release inhibitor composition of claim 17 wherein the first inorganic particle includes a rare earth metal or salt thereof and the second inorganic particle includes a Group V element or salt thereof.

19. The slow-release inhibitor composition of claim 17 wherein the first inorganic particle includes cerium or a salt thereof and the second inorganic particle includes vanadium or a salt thereof, the water-soluble organic compound includes an azole, and the first and second polymeric organic films include a hydrophobic monomer precursor.

20. The slow-release inhibitor composition of claim 19 wherein cerium or a salt thereof includes cerium acetate, vanadium or a salt thereof includes sodium metavanadate, and the azole includes triazole or a derivative thereof.

* * * * *